No. 674,090. Patented May 14, 1901.
J. VON DER KAMMER.
BROODER.
(Application filed Jan. 21, 1901.)
(No Model.)
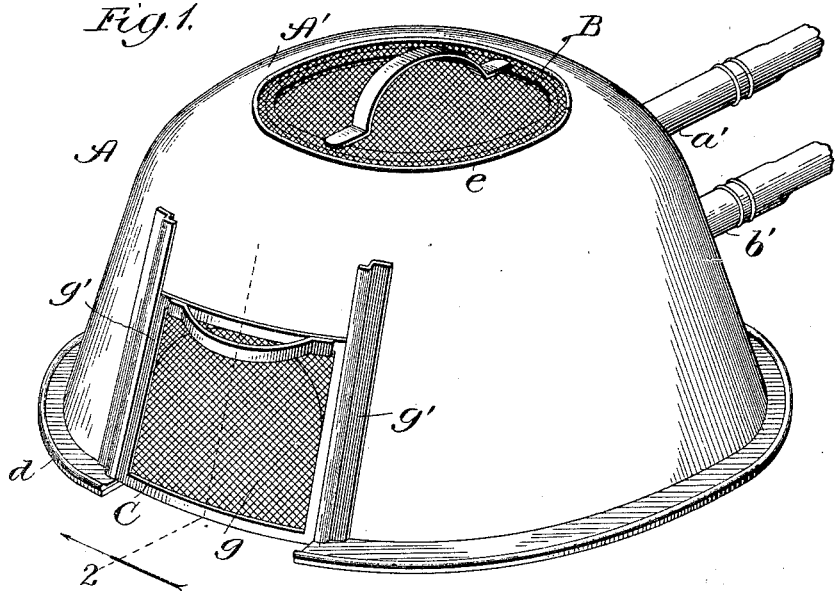
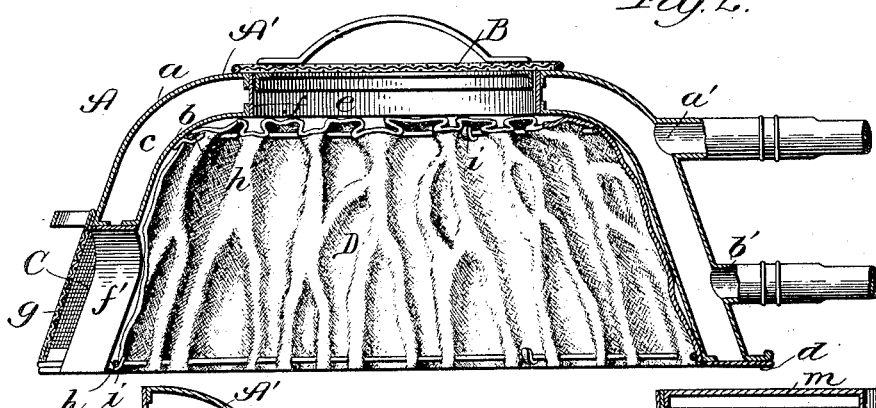
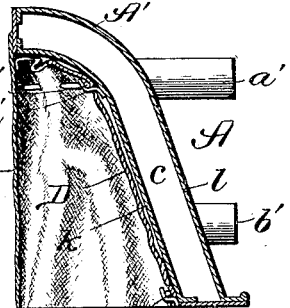
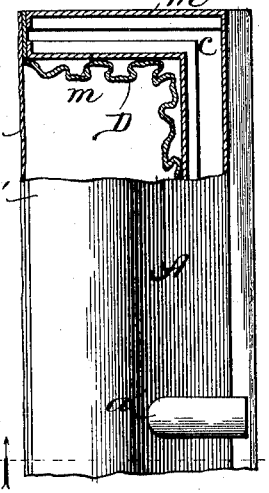
Witnesses:
Chas. Gaylord.
John Onders Jr.
Inventor:
John von der Kammer,
By Dyrenforth, Dyrenforth & Lee
Attys.

UNITED STATES PATENT OFFICE.

JOHN VON DER KAMMER, OF CHICAGO, ILLINOIS.

BROODER.

SPECIFICATION forming part of Letters Patent No. 674,090, dated May 14, 1901.

Application filed January 21, 1901. Serial No. 44,060. (No model.)

*To all whom it may concern:*

Be it known that I, JOHN VON DER KAMMER, a citizen of the United States, residing at Chicago, in the county of Cook and State of Illinois, have invented a new and useful Improvement in Brooders, of which the following is a specification.

My invention relates to an improvement in the class of devices for the artificial rearing of young chickens and other birds, the device in the class referred to consisting of a housing to which a run leads and which is heated either from above or from below or otherwise to maintain artificial heat continually throughout the space in the housing occupied by the chicks.

The experience of users of these brooders is that a proportion all too great of the chicks die. This loss, which is even greater in those of the brooders which are heated from above than in those which are heated from below the space in the housing, is attributable, primarily, to the manner in which the chicks are exposed to the artificial heat of the device. While it is more particularly necessary that the backs of the chicks shall be kept warm and their heads cool, the underneath heating subjects the under parts of the bodies to the warmth, which is injurious, since thereby the chicks are induced to lie on those parts and feathers do not grow well thereon, and the overhead heating keeps the heads of the chicks too hot. Moreover, no adequate provision is made in the class of brooders referred to for preventing "crowding" of the chicks nor for their properly breathing fresh air while housed, the defects in these two last-named particulars further contributing materially to the excessive losses from the broods.

The primary object of my improvement is to overcome more particularly the specified defects in brooders by providing a brooder of any desired general form, but which shall comprise a housing forming an inclined side closure made hollow for the circulation of the heating medium (as hot water or hot air) and adapted to warm the backs of the chicks by their contact with the inner wall of said housing without exposing the under or other parts of their bodies to artificial heat, the housing having an opening adequately large in proportion to expose the interior to free circulation therein of the outer air for maintaining throughout the interior a temperature approximately corresponding with that of said air, and said opening being, furthermore, conveniently accessible to the chicks in the brooder to enable them to crane their heads through it, and the width of the space between the inner wall of the side closure and the plane of the opening being gaged to correspond, at least approximately, with the length of a chick, so that one may not crowd ahead of another and bar it from access to the opening.

To these ends my invention consists in the general as well as the more specific construction of my improved brooder illustrated in the accompanying drawings, in which—

Figure 1 is a perspective view of the preferred form of my improved device; Fig. 2, a section taken at the line 2 on Fig. 1 and viewed in the direction of the arrow; Fig. 3, a cross-section, taken at the line 3 on Fig. 4 and viewed in the direction of the arrow, of a modified form of the device; and Fig. 4, a plan view, partly in section, of the modified form.

Of the various forms in which my improvements may be embodied (an essential feature of each of which, however, is that the side wall of the closure shall be inclined upwardly to enable the chicks to brace their backs against it) the best form thereof known to me is illustrated in Figs. 1 and 2 of the drawings. The housing A is composed of two circular inverted-dish-pan-shaped shells $a$ $b$, of sheet metal, having rounded upper ends and one being inside the other. The inner shell is of dimensions relative to the outer one leaving an adequate space $c$ between them for the circulation of the fluid heating medium employed, preferably water, which may enter the space through an opening $a'$, provided in the outer shell, and escape through an opening $b'$, shown to be provided in the same shell directly below the opening $a'$. The flanged bottom of the space $c$ is closed by a ring $d$, permanently fastened to the edges of the shells, and in the top of the housing, which affords a covering-top $A'$ to extend over the chicks, is an opening $e$, about which the space $c$ is permanently closed by a flat ring $f$, fastened over it to the edges of the shells about the opening.

The radial width of the inner shell $b$, forming the interior of the housing, the base of which may be open, as shown, or uncovered, to be closed by the bare ground or other unheated support upon which it rests, should not exceed or materially exceed from the vertical center of the opening $e$ to the base of the inner shell the length of a chick. In this way the chicks in a brood within the housing will naturally assume therein side-by-side positions about the brooder, whereby their backs are against or close to the heated surfaces of the inner inclined shell and top extension A', while their heads converge toward the central opening $e$, through which they may (all or any number of them simultaneously) crane their necks in satisfying desire for diversion. The radial width of the interior of the housing precludes the possibility of one chick crowding ahead of another to the opening, and its height is insufficient to enable one to mount the other. The opening $e$ is proportionately so large that it exposes the interior of the housing practically throughout to the surrounding air, which may thus freely circulate therein and maintain substantially throughout it a temperature approximately corresponding with that of the atmosphere about the brooder. Thus only the backs of the chicks are artificially warmed in the brooder, and this by contact with its inclined inner wall, the under and other parts of their bodies being kept cool, while the chicks may always breathe fresh cool air when warming their backs. Moreover, the proportionately large size of the opening $e$ admits so much light into the interior of the housing that it is practically as light as without, and thus affords an inducement to the chicks to enter and remain content in the brooder.

A removable grated cover B should be provided for the opening $e$ to close it when desired, as for the purpose of rendering the brooder inaccessible through the opening to rats. In one side of the hollow wall of the brooder is formed an ingress and egress passage C, which may be of the arched shape illustrated, extending upward from the base of the brooder and closed to the space $c$ by a strip of sheet metal $f'$, permanently fastened to the edges of the shells at the passage. This passage leads to the inclosed run (not shown) commonly provided in connection with brooders, and the passage should be provided, as shown, with an adjustable grated cover, as a door $g$, confined to slide between guides $g'$ on the outer shell at opposite sides of the passage and affording means for closing the passage when desired against ingress to or egress from the housing.

By way of adding to the comfort of the chicks and preventing the immediate contact of their bodies with the metal surface of the inner shell $b$, I may interpose against the latter a shield D, preferably of some soft cloth, such as flannel, a strip of which is gathered by running its opposite edge portions over springy wires $h\ h'$, which expand against the surface of the inner shell $b$ near its base and higher up, the lower wire $h$, which terminates at the opposite sides of the passage C, and the upper wire being confined by retaining-clips $i$, provided at suitable intervals on the inner shell. As will thus be seen, the hollow-walled housing forming my improved brooder affords a side or wall closure for circulation about the brooder of the heating medium and for radiating the heat horizontally and also more or less downward from the top covering of the housing upon the chicks, to whom the opening $e$ is conveniently accessible without tendency to cause them to crowd or change their positions to crane their necks through it, while they are also prevented from crowding from other causes by the dimensions of the brooder.

My improved brooder is adapted, the same as are other brooders, to be used in numbers all supplied with the heating medium from a common source. When used in that way, however, with water as the heat-circulating medium, it is preferable to couple them in multiple at the openings $a'\ b'$, rather than in series, with the water-supply, so that neither shall depend for its heating upon the spent water discharging from another.

A simpler form of the device embodying my invention is shown in Figs. 3 and 4. In this form of the brooder the inclined housing is longitudinal instead of circular, comprising inner and outer side walls $k$ and $l$ and end walls $m$, spaced apart to afford between them the closed space $c$ for the circulating heating medium. The inlet and outlet openings $a'\ b'$ are also provided, as shown, in this form of the device for the circulating fluid, and the top A', which may be a hollow continuation of the walls $k\ l$, affords a cover for the heads of the chicks by projecting from the walls forming the side closure to the proper extent to render the width of the housing the same or approximately the same as the length of a chick for preventing crowding. From the forward edge of the overhanging top there depend curtains E, of cloth or other suitable material, hanging with sufficient looseness to enable the chicks to crane their heads between and under them. In this modified construction of the brooder the open curtain-covered front forms the ingress and egress opening for the chicks and also the opening for the purposes for which the opening $e$ is provided in the form of the brooder illustrated in Figs. 1 and 2.

What I claim as new, and desire to secure by Letters Patent, is—

1. A brooder provided with an ingress and egress opening and adapted to warm the backs of chicks housed therein, by contact with its wall, without exposing the under and other parts of their bodies to artificial heat, said brooder comprising an upwardly-inclined closure composed of walls spaced apart and forming between them a closed space for the heating medium, and an opening in the brooder adequately large in proportion to expose the interior to external light and to free circulation of the surrounding air to maintain substantially throughout said interior a temperature approximately corresponding with that of said air.

2. A brooder provided with an ingress and egress opening and adapted to warm the backs of chicks housed therein, by contact with its wall, without exposing the under or other parts of their bodies to artificial heat, said brooder comprising an upwardly-inclined closure composed of walls spaced apart and forming between them a closed space for the heating medium, and an opening in the brooder accessible to the chicks therein for craning their necks through it, said opening being adequately large in proportion to expose the interior to external light and to free circulation of the surrounding air to maintain substantially throughout said interior a temperature approximately corresponding with that of said air.

3. A brooder adapted to warm the backs of chicks housed therein, by contact with its wall, without exposing the under or other parts of their bodies to artificial heat, said brooder comprising a closure composed of pan-shaped shells $a$ and $b$, one within the other, with a closed space between them for the heating medium and having a covering-top A', inlet and outlet openings in the outer shell for circulating the heating medium in said space, an opening $e$ in said top accessible to the chicks therein for craning their necks through it and adequately large in proportion to expose the interior to external light and to free circulation of the surrounding air to maintain substantially throughout said interior a temperature approximately corresponding with that of said air, and an ingress and egress passage formed through said shells, substantially as described.

JOHN VON DER KAMMER.

In presence of—
   M. S. MACKENZIE,
   ALBERT D. BACCI.